April 25, 1967  J. LA MARCA  3,315,551
LATHE TOOL
Original Filed March 3, 1965
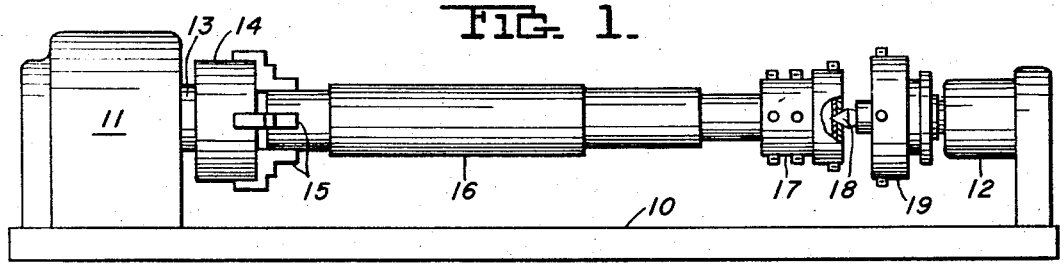
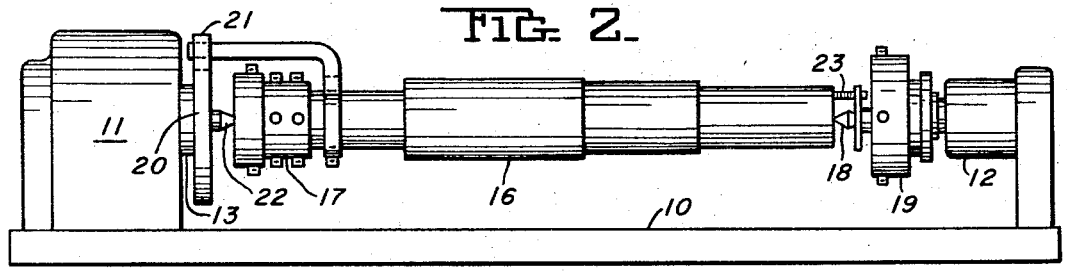
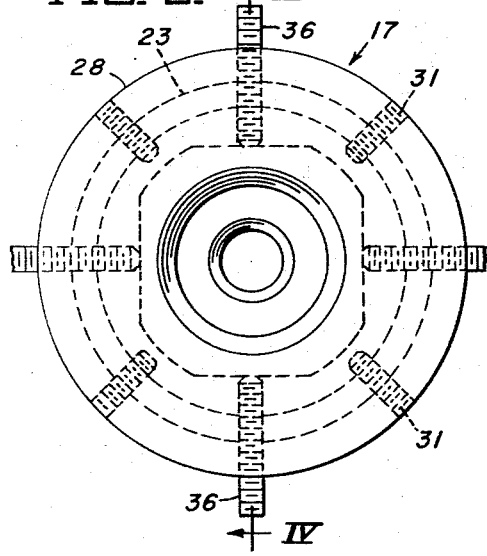
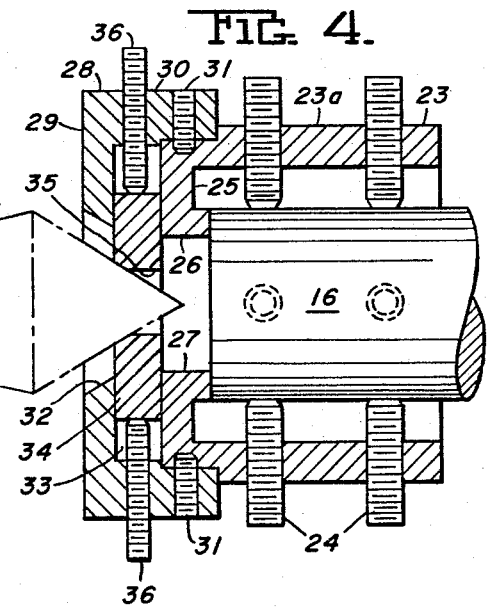
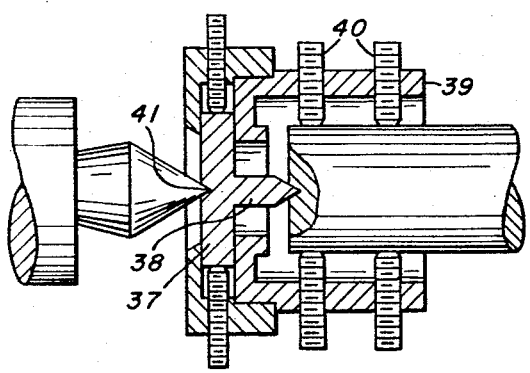
INVENTOR.
John LaMarca
By
Attorneys

UNITED STATES PATENT OFFICE 3,315,551
Patented Apr. 25, 1967

3,315,551
LATHE TOOL
John La Marca, 1312 Dormont Ave.,
Pittsburgh, Pa. 15216
Original application Mar. 3, 1965, Ser. No. 436,815. Divided and this application Oct. 5, 1966, Ser. No. 584,461
4 Claims. (Cl. 82—45)

This application is a division of my copending application Ser. No. 436,815, filed Mar. 3, 1965.

This invention relates to a tool for use with a lathe and particularly to a tool for the selective positioning of a workpiece held in a lathe.

In a lathe such as an engine lathe there is a head stock at one end of the lathe bed which includes a power driven spindle for turning a lathe chuck. The chuck has movable jaws for holding one end of a workpiece in the lathe. At the opposite end of the bed there is a tail stock adjustable towards and away from the head stock to accommodate various length workpieces. The tail stock has a center in alignment with the center of rotation of the head stock and engages the end of the workpiece. Generally the tail stock center pin is tapered to a sharp point which fits into a corresponding recess formed in the end of the workpiece. This tail stock center may be "live" or "dead," depending on whether or not it rotates with the workpiece.

After a recess or center hole is drilled in the end of a workpiece, the machining is performed and the end of the piece with the center hole is in many cases cut off. It frequently happens that a piece to be machined does not permit this to be done. In other cases the workpiece may be bent out of alignment with the head and tail stock of the lathe, in which case it is necessary to perform a forging operation to straighten the piece so that it may be positioned between the head and tail stock.

In turning eccentrices it is necessary to displace the axis of the workpiece from the axis of rotation of the lathe. Since the tail stock center of a lathe is not movable in all directions transversely of the axis of rotation, an eccentric cannot be conveniently turned except by establishing a false center. This is because the axis of the workpiece can only be offset at the head stock end by means of the chuck jaws, while the tail stock center otherwise remains fixed, so that only a taper can be turned but not an eccentric.

The tool of the invention enables a workpiece to be moved at the tail stock end in any direction in the same manner that it can be moved by the chuck jaws at the head stock end. Additionally, a workpiece can be turned either with or without drilling a center tap in the tail stock end of the piece and many bent pieces can be worked without prior straightening thereof. The net effect is a savings in time and material and an increased versatility for lathes presently in use.

The tool comprises a housing clamped on the end of the workpiece by means of set screws or the like. A cover member is fixed to the housing in a manner to provide a longitudinal extension of the housing beyond the end of the workpiece. The cover is spaced from the housing to provide a space within which is mounted a sliding plate member which is adjustable in the same manner as the live center described in my copending application Ser. No. 436,815, filed Mar. 3, 1965. The sliding plate and the end wall of the cover member have registering openings therethrough to receive the tail stock center or head stock center pin as the case may be. These openings serve as an artificial center for the workpiece so there is no need to drill a center tap in the workpiece or relocate an improperly positioned center tap.

The clamping tool may be used on the tail stock end of a workpiece in conjunction with either a dead center, an ordinary live center or the live center of the invention described in my said copending application Ser. No. 436,815. When the two tools are used together at the tail stock end, additional "throw" can be obtained since the amount of offset of the two tools can be made additive. The tool of the present invention may be used at the head stock end of the workpiece in place of a chuck or may be used by clamping it in the jaws of the chuck. A further important advantage of the invention is that the tool may be left on the workpiece when, as frequently happens, it is necessary to interrupt work on one piece to give priority to another. Thus, when work is resumed on the piece, the piece is already aligned and much saving in time is realized. As one skilled in the art will recognize, other advantages and uses for the tool are possible.

An object of the present invention is to provide an improved metal turning lathe accessory.

Another object is to provide an improved means for the selective positioning of a workpiece with respect to the axis of rotation, or with respect to the turning axis of the lathe.

These and other objects will be readily apparent and more fully understood by reference to the following description:

FIG. 1 illustrates a typical engine lathe with the tool of the invention shown in cooperating relation with the tail stock end of the lathe and a workpiece held in the lathe;

FIG. 2 is similar to FIG. 1 but shows the tool of the invention in cooperating relation with the head stock end of the lathe and the workpiece held in the lathe;

FIG. 3 is an end elevation of the lathe tool of the invention;

FIG. 4 is a side elevation of the tool of FIG. 3 taken along the line of IV—IV;

FIG. 5 is similar to FIG. 4 but shows a different embodiment of the invention.

Referring to the drawings, the tools are shown to advantage in the various views wherein like numerals indicate like parts throughout.

FIGS. 1 and 2 are general views showing the tool of the invention being used in several ways in conjunction with a workpiece held in a lathe. Referring first to FIG. 1, the lathe 10 is indicated schematically as a typical engine lathe having a head stock 11 and tail stock 12 which of course is movable toward and away from the head stock as required by the length of the workpiece. As is usual, the head stock 11 includes a motor for driving a spindle 13 which carries a chuck 14. The chuck 14 has movable jaws 15 which grip one end of a workpiece 16. On the opposite end of the workpiece there is a clamping tool 17 which is described later in more detail as shown in FIGS. 3 to 5. The clamping tool 17 receives the center pin 18 of the live center assembly 19 which is described in my aforesaid copending application to replace the conventional center pin in the tail stock.

FIG. 2 is similar to FIG. 1 but shows a face plate 20 rotated by the spindle 13, and a driving dog 21 attached to the face plate and the workpiece as is well understood by those skilled in the art. The face plate is provided with a center 22 which normally would engage the workpiece directly. However, as shown in FIG. 2, the center, called the head stock center, engages the clamping tool 17, which is held on the head stock end of the workpiece 16, in much the same manner as the tail stock center engages the tool 17 in FIG. 1. The opposite or tail stock end of the workpiece is held by the live center 19 in the customary manner. The tail stock end of the workpiece of FIG. 2 could, of course, be held as in FIG. 1, wherein the clamping tool 17 and the live center 19 are shown in cooperating relation.

The clamping tool is shown in FIGS. 3 to 5 and is indicated generally by the numeral 17. This tool comprises a hollow cylindrical body 23 the open end of which receives a workpiece 16. A plurality of set screws 24 are threaded through the side walls 23a of the body 23, extending into the space between the walls and the workpiece to clamp the workpiece. The end wall 25 of the body 23 has an inturned flange 26, which abuts the end of the workpiece 16, and a central opening 27 therethrough. There is a cover 28 having an end wall 29 and side walls 30. The side walls 30 extend in overlapping relation to the body 23 and are secured thereto by any suitable means such as the screws 31. The end wall of the cover has an opening 32 therethrough registering with and larger than the opening 27 in the body 23, and is in spaced relation to the end wall 25 of the body 23 to form a space 33 between the two end walls. Disposed in the space 33 there is a sliding plate member 34 having a central opening 35 therethrough. The plate 34 is adjustable within the space 33 by means of set screws 36 threaded through the side walls of the cover 28 and projecting into the space 33 in abutting relation to the plate 34.

The opening in the plate 35 and cover end wall 29 are preferably sloped as shown to conform to the taper of the tail stock center pin 18 or other similar pin which is entered into these openings.

With the tool 17 clamped on one end of the workpiece as shown, the tail stock center pin may be advanced and inserted into the openings 32, 35 and 27. By adjusting the set screws 36, the plate 34 may be moved to thereby offset the axis of the workpiece from the axis of the tail stock center in order to turn an eccentric or to align a bent piece, for example. Where additional offset or "throw" is desired, the set screws 24 may also be used as well as the set screws 36. With this tool the tail stock center pin 18 need never engage the workpiece itself, consequently no recesses need be formed in the workpiece resulting in savings of time and in some cases saving of material. Once a workpiece is aligned with the tool 17 clamped thereon, it can be removed with the tool 17 in place, if necessary, to give precedence to other work without disturbing the position of the slidable plate 34. When the workpiece is again positioned on the lathe, the alignment of the workpiece with respect to the tail stock center will automatically be the same as originally.

The clamping tool 17 and live center 19 can be used together at the same end or on opposite ends of the workpiece 16 as shown in FIGS. 1 and 2. In FIG. 1 one end of the workpiece is in the lathe chuck while the opposite end is fitted with the clamping tool 17 whose openings 32 and 35 are engaged by the center pin 18 of the live center assembly 19. This combination is useful also where a tubular workpiece is being machined and no center holes can be drilled for the tail stock center. The clamping tool 17 provides an artificial center hole adapted to receive the center pin 18 of the live center 19. No other adapter is necessary as in the usual manner of machining tubular pieces wherein it is necessary to provide a plug in the end of the workpiece or a conical adapter on the tail stock center in cases where the tail stock center is too small to engage the inner diameter of the hollow workpiece.

FIG. 2 shows a useful combination of the tools at opposite ends of the workpiece when it is necessary to use a head stock center 22 and a driving dog 21 to turn the piece. In this instance the clamping tool 17 is positioned at the head stock end of the piece with the live center 19 at the tail stock 12. Of course, a second clamping tool 17 may be clamped on the tail stock end of the piece and used in conjunction with the live center as before described.

Another embodiment of the tool of FIG. 4 is shown in FIG. 5. The basic tool is the same but the slidable plate 37 has a centrally located inwardly projecting auxiliary center pin 38 for engagement with the end of the workpiece which is held between the sidewalls of the body 39 by the set screws 40. The outer face of the slidable plate is provided with a recess 41 for receiving the tail stock center. The auxiliary center pin 38 is not principally a load bearing member but provides a further means for holding the workpiece in proper alignment.

The tool of the invention thus provides a lathe accessory which results in the savings of many man-hours of skilled craftsmanship and takes much of the guesswork out of machine shop operations. In current practices, for example, a workpiece such as a shaft is first positioned on a lay-out table where it is marked for center hole drilling, it is then moved to a center machine for drilling of the center hole, after which it is positioned in the lathe and some trial cuts made. Often it happens that the piece cannot be finished properly because the center hole is improperly tapped. Most frequently this is because an out-of-round configuration of the shaft is difficult to determine accurately on the lay-out table. To correct the error the piece must be removed from the lathe back to the lay-out area, the center hole plugged or welded, a new center hole marked and the above steps repeated. Sometimes this sequence of steps must be repeated many times before it can finally be finished in the lathe. With the present invention these costly trial and error techniques may be eliminated. It is necessary only to clamp the tool on the tail stock end of the workpiece. No center hole is necessary and the tail stock center can be located simply by adjusting the set screws 36 to position the slidable plate 34. Any errors in the initial location of the tail stock center can readily be corrected while the piece remains in the lathe.

In some cases, as where a customer will perform the final machining himself, it may be desired to tap a center hole anyway. In such cases the tool of the invention still saves many man-hours and eliminates much of the guesswork by using the tool as a jig or guide for the drill when center tapping, which can be accomplished simply by blocking up the workpiece to support it while the tail stock is backed off to provide access to the end of the workpiece. The drill is simply inserted in the openings 32 and 35 to tap the center hole once the piece is correctly positioned. This will enable the center to be rapidly located for future machining by a customer, for example.

Various other uses and combinations of the tool will be apparent to those skilled in the art. Likewise it is apparent that various modifications may be made in the construction and arrangement of parts within the scope and spirit of the invention.

I claim:

1. A tool for attachment to a workpiece to be turned in a lathe, comprising,
    (a) a hollow body portion having side walls, spaced outer and inner walls at one end with an opening through at least the outer end wall, and an open end for receiving the end of a workpiece between the side walls,
    (b) means mounted on the body for clamping the workpiece between the side walls,
    (c) a plate slidably disposed in the space between the outer and inner end walls with an opening in the plate smaller than and registering with the opening in the outer end wall, and
    (d) means for adjusting the plate in all directions transversely of the longitudinal axis of the workpiece while maintaining registry of the end wall and plate openings.

2. The combination as defined in claim 1 wherein the clamping means comprises a plurality of circumferentially spaced set screws passing through the side walls of the body into abutting relation with the workpiece and wherein the adjusting means comprises a plurality of circumferentially spaced set screws passing through the side walls into the space between the outer and inner end walls into abutting relation with the slidable plate.

3. A tool for attachment to a workpiece to be turned in a lathe comprising,
   (a) a hollow body portion having side walls, spaced outer and inner walls at one end with an opening through at least the outer end wall, and an open end for receiving the end of a workpiece between the side walls,
   (b) means mounted on the body for clamping the workpiece between the side walls,
   (c) a plate slidably disposed in the space between the outer and inner end walls and having an inwardly projecting center pin centrally located thereon for engaging the end of the workpiece received in the body portion and a recess on the outer side of the plate for receiving the tail stock center pin of a lathe, and
   (d) means for adjusting the plate in all directions transversely of the longitudinal axis of the body.

4. A tool for attachment to a workpiece to be turned in a lathe, comprising,
   (a) a generally cylindrical first member having an open end adapted to receive one end of a workpiece between the walls of the cylinder, the opposite end of the cylinder extending outwardly beyond the end of the workpiece,
   (b) means for clamping the workpiece in a selected position between the cylinder walls,
   (c) a second generally cylindrical member mounted on the first member and concentric therewith, the second member having an open end adapted to fit over the walls of the first member and an end wall extending beyond the outwardly extending end of the first cylinder to form a space between the two members, the end wall having an opening therein adapted to receive the center pin of a lathe,
   (d) a plate slidably disposed in the space between the cylinders, the plate having a recess therein registering with the end wall opening and adapted to receive therein the center pin of a lathe, and
   (e) means for adjusting the plate in all directions transversely of the longitudinal axes of the cylinders.

References Cited by the Examiner

UNITED STATES PATENTS

| | | | |
|---|---|---|---|
| 1,046,525 | 12/1912 | Willett | 82—40 X |
| 2,809,044 | 10/1957 | Landreth | 82—45 X |

WILLIAM W. DYER, Jr., *Primary Examiner.*

LEONIDAS VLACHOS, *Examiner.*